J. MURPHY.
MACHINE FOR MANUFACTURING RUBBER BELTING.
No. 10,938. Reissued June 12, 1888.
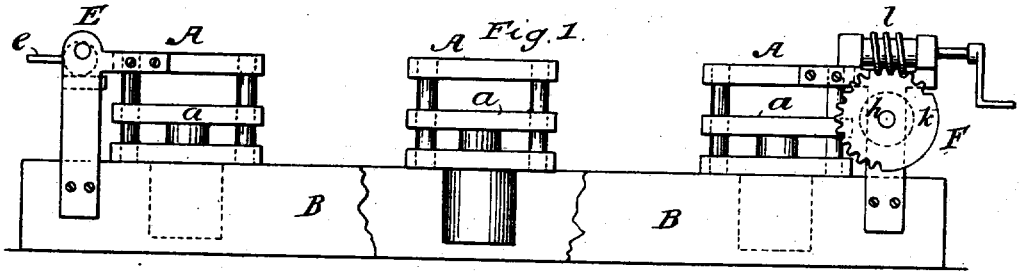
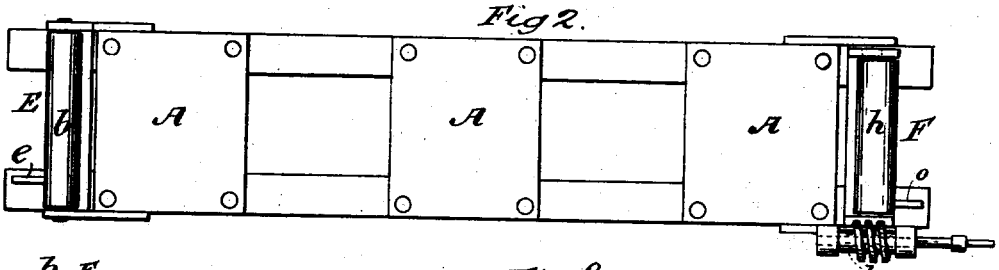
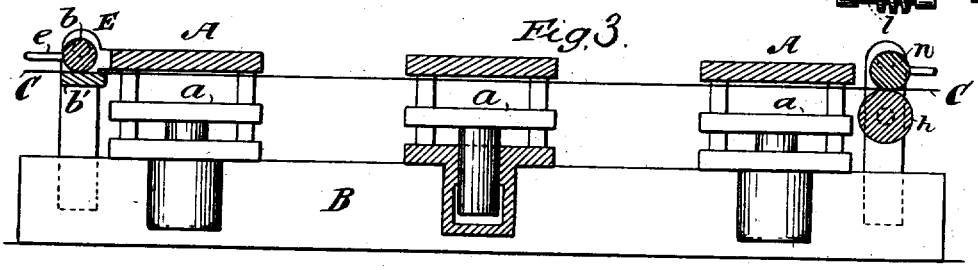
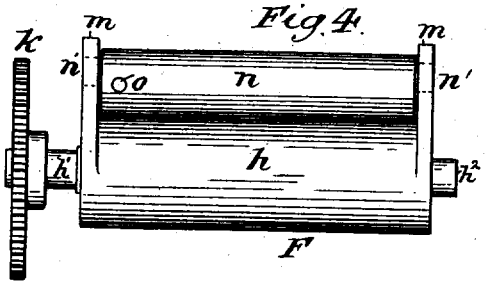
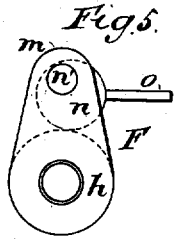
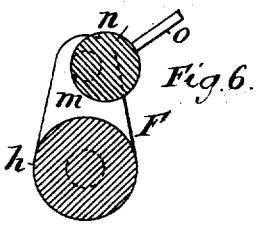
Fig. 6.
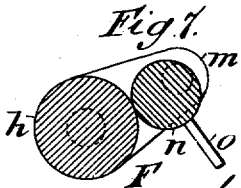
Fig. 7.
Witnesses.
Geo. Wadman.
Fred Kempfer.
Inventor:
John Murphy.
by Gifford & Brown.
Attys.
N. PETERS, Photo-Lithographer, Washington, D. C.

UNITED STATES PATENT OFFICE.

JOHN MURPHY, OF BROOKLYN, NEW YORK.

MACHINE FOR MANUFACTURING RUBBER BELTING.

SPECIFICATION forming part of Reissued Letters Patent No. 10,938, dated June 12, 1888.

Original No. 222,524, dated December 9, 1879. Application for reissue filed April 12, 1888. Serial No. 270,485.

*To all whom it may concern:*

Be it known that I, JOHN MURPHY, of Brooklyn, in the county of Kings and State of New York, have invented certain new and useful Improvements in Machines for Manufacturing Rubber Belting; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 represents a side elevation of my machine. Fig. 2 is a plan view; Fig. 3, a side elevation, partly in section; Fig. 4, an elevation of the stretching-clamp detached; Fig. 5, an end view of the same; Fig. 6, a vertical cross-section of the same, showing the raised portion of the clamping-cam; and Fig. 7, a cross-section of the same, showing the closed position of the clamping-cam and relative position of the respective parts when thrown forward in operation.

Similar letters of reference indicate corresponding parts in the several figures.

In the manufacture of rubber belting, usually composed of cotton cloth coated with rubber, the method ordinarily practiced in curing or vulcanizing it is to place the prepared belt between hot plates heated by steam and subject the same to pressure.

Presses constructed with the above features are generally made twenty feet long, or more, with continuous plates of corresponding length, and when steam is admitted in contact therewith an unequal expansion takes place, which causes them to warp and present an irregular surface that produces an uneven finish by the consequent variation of pressure; and, further, the plates are often broken when the pressure is applied and are rendered unfit for use.

The object of my present invention is to overcome these defects in the machine itself and to produce a superior product.

The invention consists, first, in substituting for the continuous plates a series of pairs of short press-heads, and corresponding platens divided by a space a trifle less than the length of a platen, each pair operating independently of the others, or connecting two or more of them for simultaneous operation, and applying the same to the entire surface of the prepared belt by moving it longitudinally a distance equal to the length of each platen at each application of the pressure.

In subjecting the prepared belt to hot plates it is necessary to apply a longitudinal strain before the pressure is applied, and stretch the same sufficiently not only to straighten it, but to produce a permanent set that will be practically maintained in use; and to accomplish the latter result my invention consists, secondly, in the adaptation of a fixed clamping device at one end of the machine, and a combined clamping and stretching device at its opposite end, hereinafter more particularly referred to.

In order that others may understand and use my invention, I will proceed to describe a machine embodying its essential features, and subsequently to define in the claims its novel characteristics.

In the drawings I have illustrated a machine in which the platens are operated by hydraulic pressure; but any well-known power may be employed.

A A A represent a series of press-heads arranged in line with each other, and divided by a space a trifle less than the length of each platen, and supported by a common base or foundation, B.

*a a a* are corresponding platens arranged directly beneath the press-heads A, and secured to the vertically-moving plungers of the water-cylinders, as shown in Figs. 1 and 3.

C is the belt to be operated upon; E, the fixed clamp, beneath which the belt is introduced to the machine; and F, the stretching-clamp.

The clamp E is composed of the stationary flat cross-bar *b'* and the cam-roller *b*, mounted within upright standards detachable from, or forming a part of, the frame of the machine. The cam-roller *b* is operated by the lever *e*, set to a horizontal position when the cam is applied and projecting a sufficient distance to obtain the necessary leverage.

The stretching-clamp F is connected to the opposite end of the machine, and composed of a roller, *h*, journaled to the fixed bearings in the frame-work, and rotated by a worm-gearing,

*k l*, attached to its shaft *h'*. The roller *h* is provided with fixed arms *m m* at its opposite ends, that form bearings *n'* for the cam-roller *n*, which is operated by means of a lever, *o*, independently of the roller *h*, and in the same manner as the cam-roller *b*.

The operation of the machine is as follows: The press-platens *a a a* are lowered to the position shown in Fig. 3, the cam-rollers *b n* elevated by means of the respective levers *e o* to the position shown in Fig. 6, the prepared belt introduced, and the cam-rollers *b n* depressed in contact with the interposed belt, as shown in Fig. 5. The worm-gearing *k l* is then operated, which revolves the roller *h* and moves the fixed arms *m m* and cam-roller *n* to the position shown in Fig. 7. The belt being securely clamped at the front end of the machine by the cam roller *b*, and between the roller *h* and cam-roller *n*, at the opposite end, it is stretched to the desired degree by the forward movement of the arms *m m*. The platens *a a a* are then elevated, and the portions of the belt between the platens and press-heads are compressed and the belt retained until it is properly cured. The respective parts of the machine are then readjusted to their first position, the belt moved forward a distance equal to the length of the space between the press-heads, and the operation repeated until every part of the surface of the belt has been acted upon.

With the same degree of tension produced at each operation of the stretching devices, and the same pressure applied to the press-platens, a belt is produced of perfect uniformity of surface and texture.

Having thus fully described a machine embodying my improvements, I do not wish to be confined to any number of presses employed in the series, as a number may be used that will operate beyond the capacity of any single press possible; therefore,

What I claim, and desire to secure by Letters Patent, is—

1. In a machine for manufacturing rubber belting, a series of presses arranged in line with each other, with intermediate spaces, in combination with suitable end clamp and stretching devices, said presses being operated by any suitable means, substantially as set forth.

2. The combination of the cam-rollers *b n*, fixed cross-bar *b'*, and roller *h*, provided with the projecting arms *m m*, substantially as described.

3. The improvement in machines for manufacturing rubber belting in which the prepared belt is subjected to hot plates, which consists in the adaptation of a fixed clamping device at one end of the machine and a combined clamping and stretching device at its opposite end, whereby the belt is stretched to produce a permanent set that will be practically maintained in use, the said fixed clamping device consisting of a stationary holding-clamp, and the said combined clamping and stretching device consisting of a vibrating stretching-clamp composed of a stationary roller, *h*, having vibrating arms *m m*, carrying a cam-roller, *n*, and suitable devices for operating the same, substantially as set forth.

In testimony that I claim the foregoing as my own I affix my signature in presence of two witnesses.

JOHN MURPHY.

Witnesses:
T. J. MORRIS,
JAMES JONES.